(12) United States Patent
Fowe

(10) Patent No.: US 10,147,315 B2
(45) Date of Patent: Dec. 4, 2018

(54) METHOD AND APPARATUS FOR DETERMINING SPLIT LANE TRAFFIC CONDITIONS UTILIZING BOTH MULTIMEDIA DATA AND PROBE DATA

(71) Applicant: HERE Global B.V., Eindhoven (NL)

(72) Inventor: James Fowe, Palatine, IL (US)

(73) Assignee: HERE Global B.V., Eindhoven (NL)

( * ) Notice: Subject to any disclaimer, the term of this patent is extended or adjusted under 35 U.S.C. 154(b) by 15 days.

(21) Appl. No.: 15/221,112

(22) Filed: Jul. 27, 2016

(65) Prior Publication Data

US 2018/0033297 A1 Feb. 1, 2018

(51) Int. Cl.
G08G 1/01 (2006.01)
G08G 1/04 (2006.01)
G01C 21/34 (2006.01)
G01C 21/36 (2006.01)

(52) U.S. Cl.
CPC ....... *G08G 1/0141* (2013.01); *G01C 21/3691* (2013.01); *G08G 1/012* (2013.01); *G08G 1/0133* (2013.01); *G08G 1/04* (2013.01)

(58) Field of Classification Search
CPC ...... G08G 1/0141; G08G 1/04; G08G 1/0133; G08G 1/012; G01C 21/3492
See application file for complete search history.

(56) References Cited

U.S. PATENT DOCUMENTS

| 8,014,937 | B2 | 9/2011 | Smyth et al. |
| 8,452,771 | B2 | 5/2013 | Kurciska et al. |
| 2004/0034467 | A1 | 2/2004 | Sampedro et al. |
| 2006/0089787 | A1 | 4/2006 | Burr et al. |

(Continued)

FOREIGN PATENT DOCUMENTS

| EP | 1 938 296 B1 | 7/2008 |
| EP | 2 278 573 A | 1/2011 |
| WO | WO 2007/103180 A2 | 9/2007 |
| WO | WO 2008/021551 A2 | 2/2008 |
| WO | WO 2011/160039 A1 | 12/2011 |
| WO | WO 2012/089281 A1 | 7/2012 |
| WO | WO 2012/104392 A1 | 8/2012 |

OTHER PUBLICATIONS

Office Action for U.S. Appl. No. 15/142,336 dated May 4, 2017, 22 pages.

(Continued)

*Primary Examiner* — Anne M Antonucci

(74) *Attorney, Agent, or Firm* — Alston & Bird LLP

(57) ABSTRACT

A method, apparatus and computer program product are provided to improve the identification and characterization of split lane traffic and other multi-modality traffic conditions. In the context of a method, multimedia data from a camera is received that is representative of traffic conditions along a road segment upstream of a junction. The method identifies a multi-modality condition along the road segment upstream of the junction based upon an analysis of the multimedia data. The method also includes evaluating a plurality of probe points representative of travel along the road segment upstream of the junction in accordance with a detection algorithm to separately determine whether the multi-modality condition exists along the road segment upstream of the junction. The method further includes determining whether to modify one or more tuning parameters of the detection algorithm based upon the multi-modality condition identified based upon the analysis of the multimedia data.

23 Claims, 5 Drawing Sheets

(56) References Cited

U.S. PATENT DOCUMENTS

| | | | |
|---|---|---|---|
| 2008/0071465 A1 | 3/2008 | Chapman et al. | |
| 2012/0095682 A1 | 4/2012 | Wilson | |
| 2012/0173530 A1 | 7/2012 | Kurciska et al. | |
| 2013/0275033 A1 | 10/2013 | Bastiaensen et al. | |
| 2013/0282264 A1 | 10/2013 | Bastiaensen et al. | |
| 2014/0278052 A1 | 9/2014 | Slavin et al. | |
| 2014/0358841 A1 | 12/2014 | Ono | |
| 2015/0057913 A1* | 2/2015 | Benhammou | G08G 1/012 701/117 |
| 2015/0317900 A1 | 11/2015 | Tashiro et al. | |
| 2016/0004915 A1 | 1/2016 | Chen et al. | |

OTHER PUBLICATIONS

Notice of Allowance for U.S. Appl. No. 14/755,927 dated Dec. 22, 2016.
"A Driving Route Made Just for You" [online] [retrieved Apr. 15, 2015]. Retrieved from the Internet: <URL: http://www.technologyreview.com/news/425271/a-driving-route-made-just-for-you/>. (dated Aug. 30, 2011); 2 pages.
"A New Kind of Fundamental Diagram with an Application to Road Traffic Emission Modelling"; [online] [retrieved Aug. 10, 2015]. Retrieved from the Internet: http://www.researchgate.net/profile/Antoine_Tordeux/publication/259535754_A_new_kind_of_fundamental_diagram_with_an_application_to_road_traffic_emission_modeling/links/00b7d52cea5f2bede2000000.pdf. (dated Mar. 2014); pp. 1-23.
International Search Report and Written Opinion for International Application No. PCT/EP2016/063758 dated Oct. 7, 2016.
Office Action for U.S. Appl. No. 14/755,927 dated Jul. 18, 2016.
U.S. Appl. No. 14/755,927, by inventor Fowe et al., entitled "Method and Apparatus for Identifying a Bi-Modality Condition Upstream of Diverging Road Segments," filed Jun. 30, 2015.
U.S. Appl. No. 15/142,336, by inventor Fowe et al., entitled "Method and Apparatus for Identifying a Split Lane Traffic Location," filed Apr. 19, 2016.
Wang, Zuchao, et al.; "Visual Traffic Jam Analysis Based on Trajectory Data"; IEEE Transactions on Visualization and Computer Graphics; vol. 19, No. 12; Dec. 2013; pp. 2159-2168.
Speeded Up Robust Features—Wikipedia [online] [retrieved Nov. 30, 2016]. Retrieved from the Internet: <URL:https://en.wikipedia.org/wiki/Speeded_up_robust_features>. 4 pages.
Viterbi Algorithm—Wikipedia [online] [retrieved Nov. 30, 2016]. Retrieved from the Internet: <URL:https://en.wikipedia.org/wiki/Viterbi_algorithm>. 9 pages.
Canny Edge Detector—Wikipedia [online] [retrieved Nov. 30, 2016]. Retrieved from the Internet: <URL:https://en.wikipedia.org/wiki/Canny_edge_detector>. 6 pages.
Office Action for U.S. Appl. No. 15/221,147 dated Feb. 7, 2018, 11 pages.

* cited by examiner

METHOD AND APPARATUS FOR DETERMINING SPLIT LANE TRAFFIC CONDITIONS UTILIZING BOTH MULTIMEDIA DATA AND PROBE DATA

TECHNOLOGICAL FIELD

An example embodiment relates generally to the detection of a split lane traffic condition, such as may exist upstream of a junction, and, more particularly, to utilizing both multimedia data and probe data in order to separately identify split lane traffic conditions.

BACKGROUND

Lane level traffic information is becoming increasingly more desirable by traffic service providers. Lane level traffic information may support a number of technologies including advanced navigation systems, connected vehicles and autonomous vehicles. However, the collection of accurate lane level traffic information is challenging and it remains difficult to reliably identify the location of a vehicle with the precision required to reliably place the vehicle within a respective lane of a road segment. Instead, most vehicles are located, such as by global positioning systems (GPS), in such a manner that the vehicles may be matched to a respective road segment, but not to any particular lane of the road segment.

The technique has been developed, however, to identify split lane traffic, that is, the traffic that travels along a road segment that splits or is otherwise divided into two or more downstream road segments, such as an exit ramp that splits from an ongoing roadway. Split lane traffic may sometimes create a bi-modality condition in which traffic in some of the lanes moves at a higher speed than traffic in other lanes. For example, the traffic in the lanes that are utilized to access an exit ramp may slow to a greater degree than the traffic in the other lanes that generally continue onward past the exit ramp. For example, at rush hour and other times during which the roadway carries an appreciable volume of traffic, the lane from which the exit ramp is accessed may be slowed to a much greater degree than the traffic in the other lanes that is generally continuing onward past the exit ramp. At other times, such as in instances in which the traffic volume is relatively light, all of the lanes of traffic for the road segment upstream of the diverging downstream road segments may proceed at approximately the same speed with little, if any, reduction of speed in the lane from which the exit ramp is accessed.

By identifying the bi-modality condition sometimes created by split lane traffic, the different speeds at which the split lane traffic is traveling along the road segment approaching the diverging downstream road segments may be identified and those different speeds may be associated with different lanes of the road segment. Thus, navigation systems may take into account the bi-modality condition of split lane traffic along a road segment approaching diverging downstream segments and, as such, provide enhanced navigation services, such as by directing a vehicle to a lane that is moving at a greater speed if the vehicle does not otherwise need to be in a lane that is moving at a slower speed, such as in an instance in which the route of the vehicle continues along the roadway such that the vehicle need not be in the lane with slower traffic that is accessing an exit ramp.

However, the impact of split lane traffic may vary from one junction to another as a result of, for example, the different traffic flow patterns supported by the junctions. Thus, the split lane traffic analysis may generate more accurate lane level traffic information for some junctions than for other junctions. Additionally, the determination of the bi-modality condition exhibited by split lane traffic is based upon the analysis of probe data, such as a compilation of probe points provided by vehicles traversing the road segment upstream of the diverging downstream road segments. The probe data is dynamic and varies from junction to junction and from time to time based on, for example, the number of probe points collected for respective road segments and/or the quality of the probe data, such as may be impacted by changes in the precision of the GPS that determines the location of the probe points. As a result of these variations in the probe data, the accuracy with which the bi-modality condition exhibited by split lane traffic along the road segment upstream of diverging downstream road segments may also vary, thereby impacting the accuracy of the lane level traffic information.

BRIEF SUMMARY

A method, apparatus and computer program product are provided in accordance with an example embodiment in order to improve the identification and characterization of split lane traffic and other multi-modality traffic conditions. As such, traffic conditions along a road segment upstream of a junction may be more accurately analyzed in order to detect multi-modality conditions and to provide more precise lane level traffic information. In this regard, the method, apparatus and computer program product of an example embodiment utilize both multimedia data from a camera and probe data provided by probes traversing the respective road segment in order to improve upon the manner in which a multi-modality condition is detected and characterized. In some embodiments, the method, apparatus and computer program product may also cause an alert message to be provided based upon the multi-modality condition as a result of the analysis of the multimedia data in order to provide further lane level traffic information to drivers.

In an example embodiment, a method is provided that includes receiving multimedia data from a camera representative of traffic conditions along a road segment upstream of a junction and identifying a multi-modality condition along the road segment upstream of the junction based upon an analysis of the multimedia data. The method also includes evaluating a plurality of probe points representative of travel along the road segment upstream of the junction in accordance with a detection algorithm to separately determine whether the multi-modality condition exists along the road segment upstream of the junction. The method further includes determining whether to modify one or more tuning parameters of the detection algorithm, such as a minimum probe count, a bi-modality magnitude, a congestion criteria or a persistence duration, based upon the multi-modality condition identified based upon the analysis of the multimedia data.

A method of an example embodiment also includes causing an alert message to be provided based upon the multi-modality condition identified based upon the analysis of the multimedia data. The alert message may include an image of the traffic conditions along the road segment upstream of the junction. In an embodiment in which the multimedia data includes one or more images, the method identifies the multi-modality condition based upon the analysis of the multimedia data by analyzing the one or more images to identify the multi-modality condition based upon an estimated volume of vehicles in each of a plurality of lanes of the road segment. In this regard, the method of an example embodiment analyzes the one or more images to identify the multi-modality condition by identifying the multi-modality condition based upon a difference in the estimated volume of vehicles between two of the plurality of lanes of the road segment. The method of an example embodiment also includes subsequently evaluating the plurality of probe points representative of travel along the road segment upstream of the junction in accordance with the detection algorithm and utilizing the one or more tuning parameters, as modified, to determine whether the multi-modality condition exists along the road segment upstream of the junction.

In another example embodiment, an apparatus includes at least one processor and at least one memory including computer program instructions with the at least one memory and the computer program instructions, with the at least one processor, causing the apparatus at least to receive multimedia data from a camera representative of traffic conditions along a road segment upstream of a junction and to identify a multi-modality condition along the road segment upstream of the junction based upon an analysis of the multimedia data. The at least one memory and the computer program instructions, with the at least one processor, also include causing the apparatus to evaluate a plurality of probe points representative of travel along the road segment upstream of the junction in accordance with a detection algorithm to separately determine whether the multi-modality condition exists along the road segment upstream of the junction. The at least one memory and the computer program instructions, with the at least one processor, further cause the apparatus to determine whether to modify one or more tuning parameters of the detection algorithm, such as a minimum probe count, a bi-modality magnitude, a congestion criteria or a persistence duration, based upon the multi-modality condition identified based upon the analysis of the multimedia data.

The at least one memory and the computer program instructions, with the at least one processor, further cause the apparatus of an example embodiment to cause an alert message to be provided based upon the multi-modality condition identified based upon the analysis of the multimedia data. The alert message of an example embodiment also includes an image of the traffic conditions along the road segment upstream of the junction. In an embodiment in which the multimedia data comprises one or more images, the at least one memory and the computer program instructions, with the at least one processor, cause the apparatus of an example embodiment to identify the multi-modality condition based upon the analysis of the multimedia data by analyzing the one or more images to identify the multi-modality condition based upon an estimated volume of vehicles in each of a plurality of lanes of the road segment. The at least one memory and the computer program instructions, with the at least one processor, cause the apparatus of an example embodiment to analyze the one or more images to identify the multi-modality condition by identifying the multi-modality condition based on a difference in the estimated volume of vehicles between two of the plurality of lanes of the road segment. The at least one memory and the computer program instructions, with the at least one processor, further cause the apparatus of an example embodiment to subsequently evaluate the plurality of probe points representative of travel along the road segment upstream of the junction in accordance with the detection algorithm and utilize the one or more tuning parameters, as modified, to determine whether the multi-modality condition exists along the road segment upstream of the junction.

In a further example embodiment, a computer program product is provided that includes at least one non-transitory computer-readable storage medium bearing computer program instructions embodied therein for use with a computer with the computer program instructions including program instructions which, when executed, cause the computer at least to: receive multimedia data from a camera representative of traffic conditions along a road segment upstream of a junction and to identify a multi-modality condition along the road segment upstream of the junction based upon an analysis of the multimedia data. The computer program instructions also includes program instructions which, when executed, cause the computer to evaluate a plurality of probe points representative of travel along the road segment upstream of the junction in accordance with a detection algorithm to separately determine whether the multi-modality condition exists along the road segment upstream of the junction. The computer program instructions further include program instructions which, when executed, cause the computer to determine whether to modify one or more tuning parameters of the detection algorithm based upon the multi-modality condition identified based upon the analysis of the multimedia data.

The computer program instructions of an example embodiment also include program instructions configured to cause an alert message to be provided based upon the multi-modality condition identified based upon the analysis of the multimedia data. The one or more tuning parameters of an example embodiment include a minimum probe count, a bi-modality magnitude, a congestion criteria or a persistence duration. In an embodiment in which the multimedia data includes one or more images, the program instructions configured to identify the multi-modality condition based upon the analysis of the multimedia data include, in an example embodiment, program instructions configured to analyze the one or more images to identify the multi-modality condition based upon an estimated volume of vehicles in each of a plurality of lanes of the road segment. The program instructions configured to analyze the one or more images to identify the multi-modality condition include, in an example embodiment, program instructions configured to identify the multi-modality condition based a difference in the estimated volume of vehicles between two of the plurality of lanes of the road segment. The computer program instructions of an example embodiment further include program instructions configured to subsequently evaluate the plurality of probe points representative of travel along the road segment upstream of the junction in accordance with the detection algorithm and to utilize the one or more tuning parameters, as modified, to determine whether the multi-modality condition exists along the road segment upstream of the junction.

In yet another example embodiment, an apparatus is provided that includes means for receiving multimedia data from a camera representative of traffic conditions along a road segment upstream of a junction and means for identifying a multi-modality condition along the road segment upstream of the junction based upon an analysis of the multimedia data. The apparatus also includes means for evaluating a plurality of probe points representative of travel along the road segment upstream of the junction in accordance with a detection algorithm to separately determine whether the multi-modality condition exists along the road segment upstream of the junction. The apparatus further includes means for determining whether to modify one or more tuning parameters of the detection algorithm, such as a minimum probe count, a bi-modality magnitude, a congestion criteria or a persistence duration, based upon the multi-modality condition identified based upon the analysis of the multimedia data.

BRIEF DESCRIPTION OF THE DRAWINGS

Figure 1:
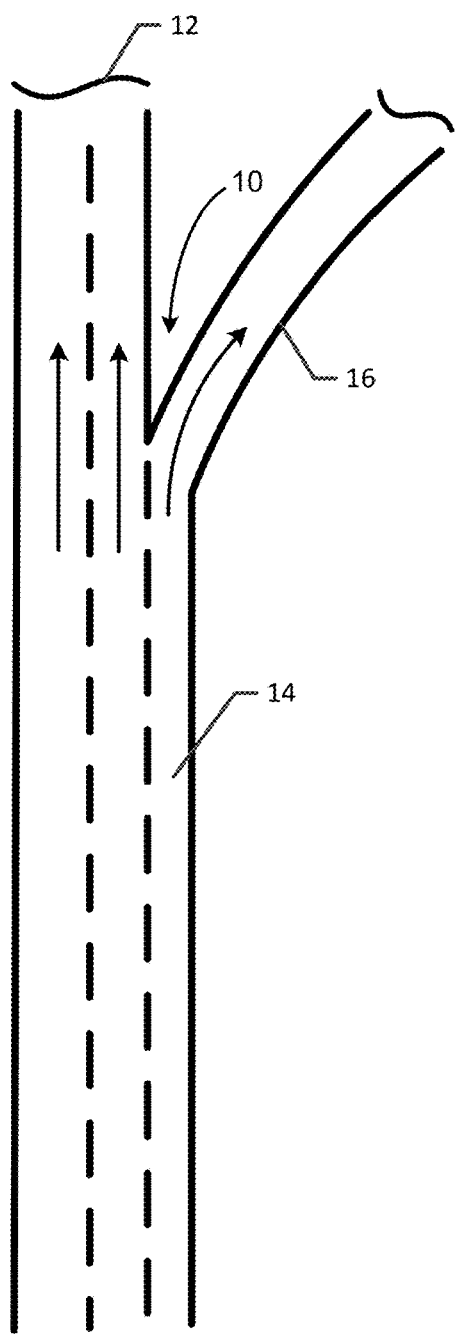
Figure 2:
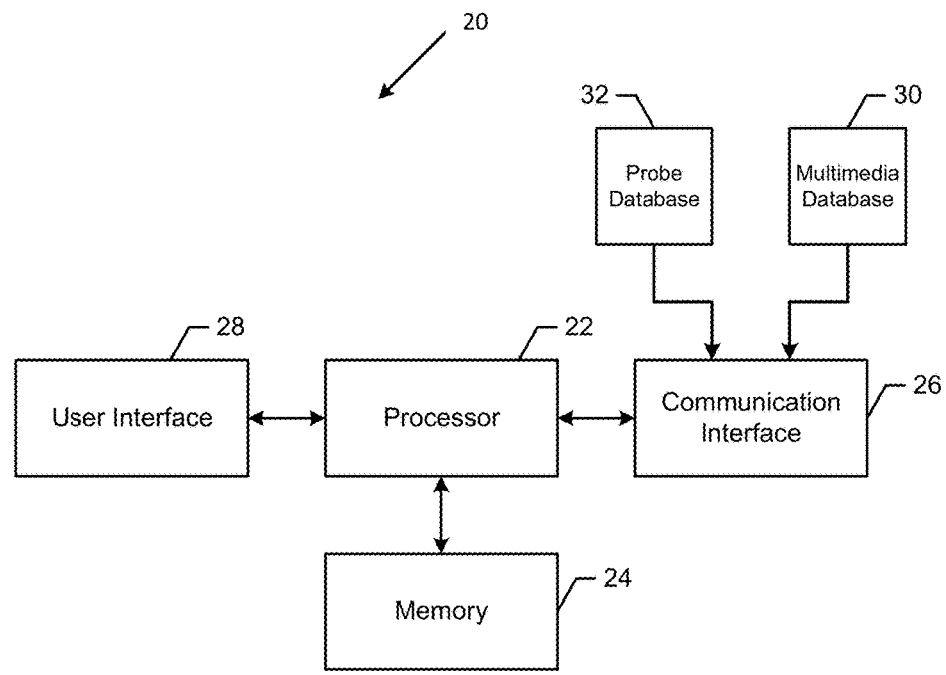
Figure 3:
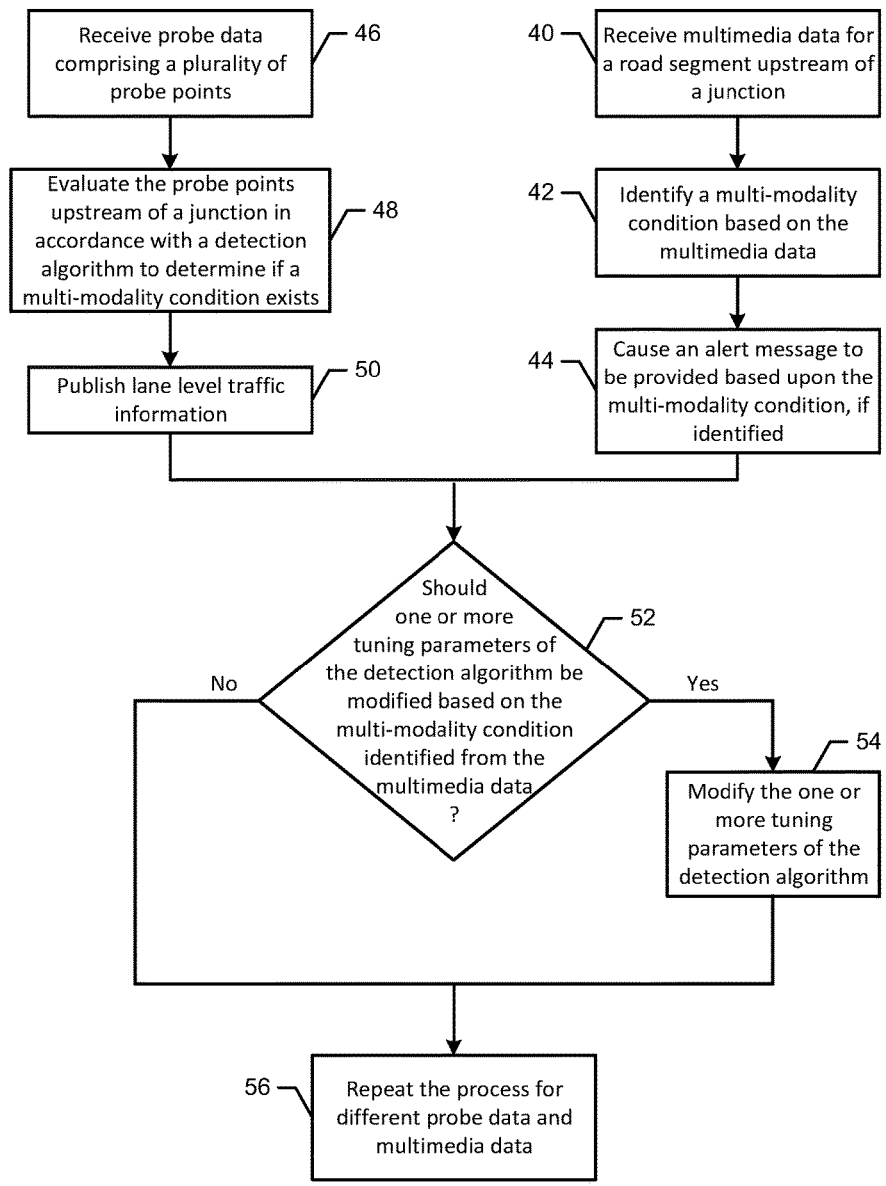
Figure 4:
Figure 5:
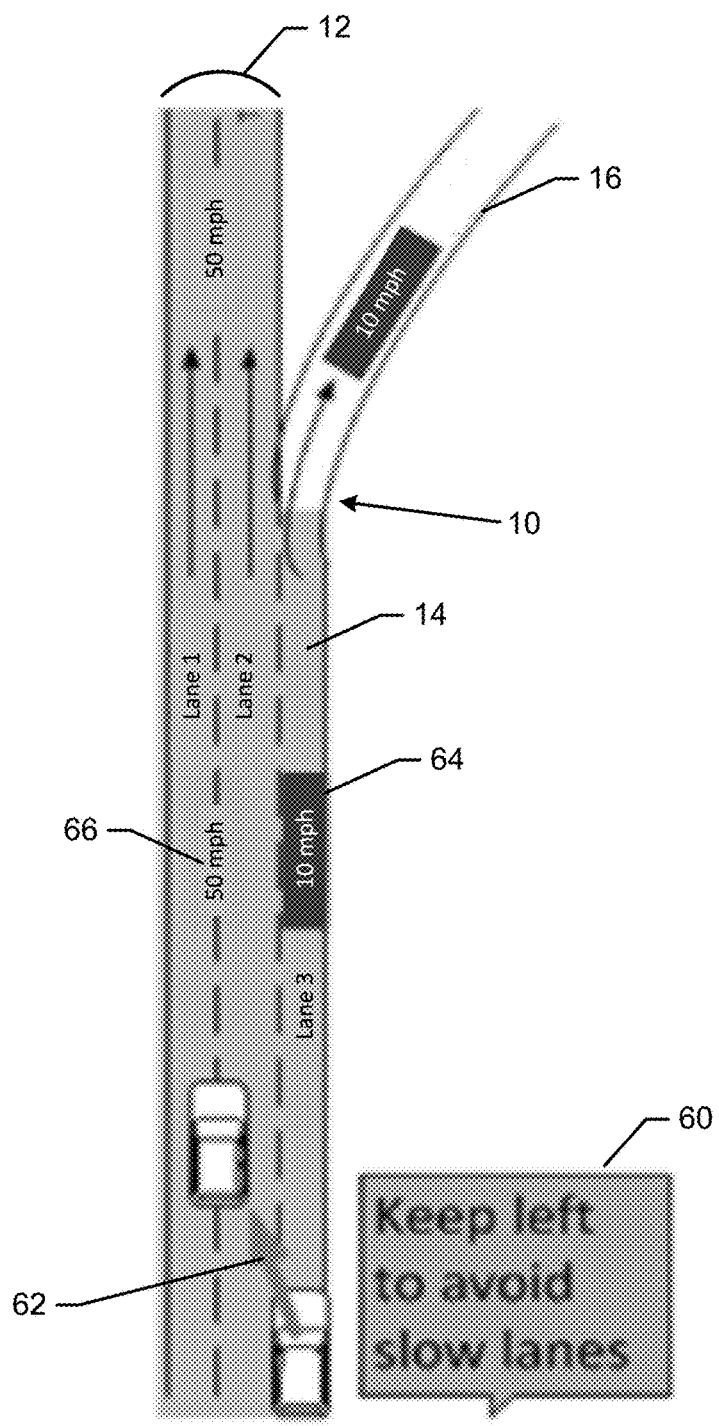

Having thus described certain example embodiments of the present disclosure in general terms, reference will hereinafter be made to the accompanying drawings, which are not necessarily drawn to scale, and wherein:

FIG. 1 illustrates an upstream road segment and diverging downstream road segments that are evaluated in the accordance with an example embodiment of the present invention;

FIG. 2 is a block diagram of an apparatus that may be specifically configured in accordance with an example embodiment of the present invention;

FIG. 3 is a flowchart illustrating operations performed, such as by the apparatus of FIG. 2, in accordance with an example embodiment of the present invention;

FIG. 4 is an image of a junction represented by multimedia data captured by a camera; and FIG. 5 is a representation of a manner in which an alert message may be provided based upon a multi-modality condition that has been identified from an analysis of multimedia data in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to enhance the provision of lane level traffic information, such as for navigation purposes. In order to provide enhanced lane level traffic information, the method, apparatus and computer program product of an example embodiment rely upon a synergistic combination of multimedia data and probe data. In this regard, the multimedia data and the probe date are separately analyzed in order to determine a multi-modality condition along a road segment upstream of a junction. Based upon a comparison of the multi-modality condition separately determined utilizing the multimedia data and the probe data, the detection algorithm that is utilized to detect a multi-modality condition from the probe data is tuned based upon the multi-modality condition identified from the multimedia data. By modifying the tuning parameters of the detection algorithm, subsequent determinations of a multi-modality condition based upon an analysis of the probe data by the detection algorithm may be performed more precisely. Thus, the detection algorithm may be adapted to accurately detect multi-modality conditions for different junctions having different traffic flow patterns and in instances in which the dynamic nature of the probe data results in different quantities of probe points and/or in probe points of different precision in terms of the location associated with the probe points.

The method, apparatus and computer program product identify a multi-modality condition along a road segment upstream of a junction. The junction that is approached by the road segment may be any of a variety of junctions in which a vehicle traveling along the roadway approaching the junction has the option of continuing along any one of two or more roadways that intersect at the junction. In this regard, a junction may include a intersection of two or more roads as well as junctions defined by the splitting of one road, e.g., an exit ramp, from another roadway that continues past the junction, such as in the case of an entrance or exit ramp splitting from a highway or other thoroughfare. Regardless of the type of junction, the road segment that is the subject of the analysis described herein is upstream of the junction, such as by being immediately upstream of the junction with the road segment leading into and, in turn, defining a portion of the junction.

One example of a junction 10 is depicted in FIG. 1. As shown, this junction includes an ongoing roadway having multiple lanes. At the junction, a road segment diverges from ongoing roadway, such as in an instance in which an exit ramp exits from the ongoing roadway. In this configuration, the road segment upstream of the junction includes a plurality of lanes 12 that continue onward past the exit ramp 16 and one lane 14, that is, the rightmost lane, that is utilized by traffic that accesses the exit ramp.

The junction 10 of the type depicted in FIG. 1 may support split lane traffic with some traffic exiting the ongoing roadway onto the exit ramp 16 and other traffic continuing onward along the ongoing roadway past the exit ramp. The split lane traffic may sometimes create a multi-modality condition for the road segment upstream of the junction in which traffic in some of the lanes moves at a higher speed than traffic in other lanes. In instances in which split traffic creates a multi-modality condition for the road segment immediately upstream of the junction, the variation in traffic flow over the course of time may correspondingly cause the multi-modality condition to be vary over time and, in some instances, only exist during certain periods of time, such as during rush hour, and not in other periods of time.

In order to detect a multi-modality condition along the road segment upstream of the junction 10, an apparatus 20 is provided, one example of which is shown in FIG. 2. The apparatus may be embodied with a variety of computing devices including, for example, a navigation system, an advanced driver assistance system (ADAS), a GPS system or the like. Additionally or alternatively, the apparatus may be embodied in other types of computing devices, such as a server (such as the server of a traffic provider service), a personal computer, a computer workstation, a laptop computer, a plurality of networked computing devices or the like, that are configured to analyze probe points, such as for traffic estimation or other purposes. Regardless of the type of computing device that embodies the apparatus, the apparatus of an example embodiment may include, may be associated with or may otherwise be in communication with a processor 22 and a memory device 24 and optionally a communication interface 26 and/or a user interface 28.

In some embodiments, the processor 22 (and/or co-processors or any other processing circuitry assisting or otherwise associated with the processor) may be in communication with the memory device 24 via a bus for passing information among components of the apparatus 20. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment also optionally includes a communication interface 26 that may be any means such as a device or circuitry embodied in either hardware or a combination of hardware and software that is configured to receive and/or transmit data from/to other electronic devices in communication with the apparatus, such as by being configured to receive probe data from a database 32, cloud storage or other external memory device, to receive multimedia data from a camera, a database 30, cloud storage or other external memory device and/or to provide traffic information, including lane level traffic information, to a routing and navigation system, a traffic service provider, an in-vehicle GPS, in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 4, the apparatus 20 may also optionally include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 22 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24 and/or the like).

The apparatus 20 of an example embodiment identifies a multi-modality condition along the road segment upstream of the junction 10 based upon the separate analysis of multimedia data from a camera and probe data consisting of a plurality of probe points collected by probes traveling along the road segment. The receipt and analysis of the multimedia data and the probe data may proceed in parallel as shown in FIG. 3. Alternatively, the receipt and analysis of the multimedia data and the probe data may be performed sequentially or in any other temporal relationship so long as the multimedia data and the probe data both relate to the traffic flow along the road segment during the same period of time, such as during the same time epoch. In this regard, time epochs define different periods of time, but, in an example embodiment, each time epoch has the same length, such as five minutes. Thus, the collection and the separate analysis of the multimedia data and the probe data described herein in conjunction with FIG. 3 may be repeated for each or at least a plurality of the time epochs so as to take into account variations in the traffic flow over the course of time.

As shown in block 40 of FIG. 3, the apparatus 20 includes means, such as the processor 22, the communication interface 26 or the like, for receiving multimedia data from a camera with the multimedia data representative of traffic conditions along the road segment upstream of the junction 10. The camera may be a traffic camera positioned to have a field of view that includes the junction and the road segment upstream of the junction as shown in FIG. 4. While the apparatus, such as the processor, may be configured to receive and analyze a variety of different types of multimedia data, the apparatus such as the processor, of an example embodiment receives multimedia data in the form of one or more images including, for example, one or more still images, a video or the like. The multimedia data may be received from the camera and stored by memory 24. Alternatively, the multimedia data captured by the camera may be stored remotely, such as in a database 30, cloud storage or other external memory device accessible to the apparatus, such as via the communication interface as shown in FIG. 2.

The apparatus 20 also includes means, such as the processor 22 or the like, for identifying a multi-modality condition along the road segment upstream of the junction 10 based upon an analysis of the multimedia data. See block 42 of FIG. 3. In this regard, a road segment experiences a multi-modality condition in an instance in which the speed, e.g., the average speed, of the traffic in the different lanes of the road segment varies significantly, such as by at least a predefined amount, typically due to different amounts of traffic in the various lanes of the road segment. The multimedia data may be analyzed in various manners in order to identify a multi-modality condition. In an example embodiment in which the multimedia data includes one or more images, however the apparatus includes means, such as the processor or the like, for analyzing the one or more images to identify the multi-modality condition based upon an estimated volume of vehicles in each of a plurality of lanes of the road segment. For an example of a technique for estimating the volume or density of vehicles in each lane of a road segment, reference is made to U.S. patent application Ser. No. 14/324,797 entitled "Lane Level Traffic" filed on Jul. 7, 2014, the contents of which are incorporated by reference herein.

In an example embodiment in which estimated volume of vehicles in each lane of the road segment is determined in order to identify a multi-modality condition, the apparatus 20, such as the processor 22, may be configured to identify the multi-modality condition based upon a difference in the estimated volume of vehicles between two of the plurality of lanes of the road segment. Although the images that comprise the multimedia data of this example embodiment may be analyzed in various manners. The apparatus, such as the processor of an example embodiment may rely upon computer vision, and, more particularly, may utilize image segmentation algorithms to count the volume of vehicles in each lane of the road segment. For example, the image segmentation algorithms may map vehicular volume information at a lane level. Although various image segmentation algorithms may be utilized, the apparatus, such as the processor, of an example embodiment may initially process the image with a Canny edge detection algorithm and may subsequently process the resulting image produced by the application of the Canny edge detection algorithm utilizing a Speeded Up Robust Features (SURF) algorithm for feature detection so as to obtain, for the respective image, an estimated total number of vehicles in each lane of the road segment approaching the junction.

In this example embodiment, once the volume of vehicles in the different lanes of the road segment has been determined, such as by the image segmentation algorithms, the apparatus 20, such as the processor 20, may be configured to compare the estimated volume of vehicles in the different lanes of the road segment in order to determine if a multi-modality condition exists. For example, the apparatus, such as the processor, may be configured to compare the volume of vehicles in the lane of the road segment that has the largest volume to the volume of vehicles in the lane of the road segment that has the smallest volume. In this regard, the apparatus, such as the processor, may determine a ratio of the volume of vehicles in the lane of the road segment that has the greatest volume relative to the volume of vehicles in the lane of the road segment that has the smallest volume. In an instance in which the difference between the volume of vehicles of the lanes of the road segment having the greatest and the smallest volumes exceeds a predefined threshold, the apparatus, such as the processor, may be configured to identify the road segment as having a multi-modality condition, that is, to include lanes with significantly different numbers of vehicles that, in turn, cause the traffic in the respective lanes to travel at appreciably different speeds. As another example, in an embodiment in which the apparatus, such as the processor, determines that the ratio between the volumes of the vehicles in the lanes of the road segment having the greatest and the smallest numbers of vehicles satisfies a predetermined condition, such as by exceeding a predefined value, the apparatus, such as the processor, may be configured to identify the existence of a multi-modality condition.

In an example embodiment, the apparatus 20 includes means, such as the processor 22, the communication interface 26 or the like, for causing an alert message to be provided based upon the multi-modality condition identified based upon the analysis of the multimedia data. See block 44. The alert message may take various forms and, in one embodiment, may include an image, such as a still image of the type shown in FIG. 4, of the traffic conditions along the road segment upstream of the junction 10. This image may be provided to subscribers or drivers who may utilize the information, such as to avoid the more heavily congested lanes of the road segment. Additionally or alternatively, this image may be provided to governmental agencies, such as the Department of Transportation. In an example embodiment, the apparatus, such as the processor, is configured to cause an alert message to be provided to subscribers via, for example, a navigation system. As shown in FIG. 5, the alert message may be delivered via a navigation system which, in turn, may provide a visible and/or audible alert of the multi-modality condition including, for example, the provision of lane level traffic information including an indication, such as a visible demarcation, of the lane(s) that are more heavily congested and the lane(s) that are more freely flowing. In FIG. 5, for example, an alert message 60 that suggests moving to the left lanes to avoid congestion and a corresponding visual representation 62 of a vehicle moving to the left lanes may be presented to assist the driver in avoiding congestion. In this example, an alert 64 in the lane 14 of the road segment approaching the exit ramp 16 may also indicate that traffic flow is slower, such as 10 miles per hour (mph), while an alert 66 in the lanes 12 of the road segment that continue onward past the exit ramp may indicate that traffic flow is faster, such as 50 mph. As such, a driver may rely upon the alert messages and may avoid the heavily congested lanes if the driver is able to do so while still following the intended route.

As noted above, the apparatus 20 of an example embodiment not only analyzes the multimedia data in order to identify multi-modality conditions, but also analyses probe data to identify a multi-modality condition along the road segment approaching the junction 10. In this regard, the apparatus includes means, such as the processor 22, the memory 24, the communication interface 26 or the like, for receiving probe data. See block 46 of FIG. 3. The probe data consists of a plurality of probe points. Probe points are frequently captured by GPS systems, navigation systems or the like that are mounted in vehicles or are embodied by mobile devices, such as smartphones, tablets or other mobile terminals carried by passengers in a vehicle. Each probe point is associated with a location, such as may be expressed in terms of latitude and longitude, and in some instances may be map matched so as to be associated with a respective road segment, such as a respective link of a roadway. Some probe points are also associated with a heading and a speed at which the GPS system or the navigation system was moving at the time at which the probe point was captured. The probe data may be collected and stored, such as in a probe database 32, and then subsequently analyzed as historical probe data. Alternatively, the probe data may be collected and analyzed in real time or near real time in order to determine a current assessment of the traffic flow through a junction. As with the multimedia data, the probe data may be received from probes via the communication interface and, in some instances, stored by memory. Alternatively, the probe data may be collected from the probes and stored in an external probe database, cloud storage or the like that is accessible to the apparatus, such as via the communication interface.

As shown in block 48 of FIG. 3, the apparatus 20 of this example embodiment includes means, such as the processor 22 or the like, for evaluating a plurality of probe points of the probe data representative of travel along the road segment upstream of the junction 10. The apparatus, such as the processor, evaluates the probe data in accordance with a detection algorithm so as to determine whether a multi-modality condition exists along the road segment upstream of the junction. Although the same road segment upstream of the same junction is analyzed during the same period of time, such as during the same time epoch, the determination of a multi-modality condition based upon the probe data is performed separately from the determination of a multi-modality condition based upon the multimedia data from a camera.

The apparatus 20, such as the processor 22, may utilize various detection algorithms in order to detect a multi-modality condition from the probe data. One example of a detection algorithm is provided by U.S. patent application Ser. No. 14/755,927 entitled "Method and Apparatus for Identifying a Bi-Modality Condition Upstream of Diverging Road Segments" and filed on Jun. 30, 2015 and U.S. patent application Ser. No. 15/142,336 entitled "Method and Apparatus for Identifying a Split Lane Traffic Location and filed on Apr. 29, 2016, the contents of both of which are incorporated herein by reference.

In an example embodiment, however, the apparatus 20, such as the processor 22, is configured to analyze the plurality of probe points to determine whether a multi-modality condition exists in accordance with a bi-modality detection algorithm as set forth in pseudo code below:

```
V ← {a set of probe speeds in an epoch}
function BDM(V):
    s ← STD(V)
    m ← mean(V)
    V ← V ∀ V < m + 2s & V > m − 2s        //first outlier filtering
    d ← Range(V)/8
    for i ← 1 to 8                          //bucketizing
        b_i ← {V ∀ V < max(V) & V > (max(V) − d)}
        V ← V − b_i
    end for
    V ← b_1 + b_2 + . . . + b_8             //restore V
    for i ← 2 to 8                          //biased outlier rejection in favour of faster speeds BiM ← (mean(b_1) − mean(b_i)) / Range(V)

if |b_1| > 3 and (|V| − |b_1|) > 3 and BiM > 0.4    //3 & 0.4 are tuning paramters
            then return: {(mean(b_1), mean(V − b_1), BiM}   //HS, LS & BiM returned
        else b_1 ← b_1 + b_i
        end if
    end for
end BDM
```

As shown in the foregoing pseudo code, probe points associated with speeds that are outliers, such as probe points associated with speeds that are more than two standard deviations away from the mean, may be filtered or eliminated. Thereafter, the remaining speeds associated with the probe points of the respective epoch may be separated into bins $b_1, b_2, \ldots b_8$ and the bi-modality value BiM may be determined based upon the difference between the means of the various bins as normalized based upon the range. In this analysis, the normalized difference between the means of the different bins may be subjected to various predefined conditions, such as $|b_1|>3$ and BiM>0.4, with the predefined conditions defining tuning parameters that may be varied by the system designer to ensure the desired performance. In this regard, the tuning parameters may be selected so as to return only as single pair of speeds, representative of the higher speed cluster and the lower speed cluster, as well as the magnitude of bi-modality BiM.

Based upon the analysis of the probe data, the apparatus 20 includes means, such as the processor 22, the communication interface 26 or the like, for publishing lane level traffic information. See block 50 of FIG. 3. The lane level traffic information generally provides the different speeds that were detected along the road segment upstream of the junction 10, such as a higher speed and a lower speed. Additionally, the lane level traffic information maps the different speeds to respective lanes of the road segment, such as by mapping the lower speed to the right lane 14 in the foregoing example of FIG. 1 that provides access to the exit ramp 16 and the higher speeds to the remaining lanes 12 of the ongoing roadway. Thus, the lane level traffic information that is determined based upon an analysis of the probe data is published, such as to subscribers or drivers who may utilize the information, such as to avoid the more heavily congested lanes of the road segment, and/or to governmental agencies, such as the Department of Transportation.

As shown in block 52 of FIG. 3, the apparatus 20 includes means, such as the processor 22 or the like, for determining whether to modify one or more tuning parameters of the detection algorithm based upon the multi-modality condition identified from an analysis of the multimedia data. Thus, the apparatus, such as the processor, is configured to compare the results of the multi-modal analysis that has been separately performed based upon the multimedia data from the camera and based upon the probe data. In instances in which the results are the same, such as in instances in which the same multi-modality condition is detected by an analysis of the multimedia data from the camera and from an analysis of the probe data, the apparatus, such as the processor, determines that the one or more tuning parameters of the detection algorithm need not be modified since the results of the multi-modality detection algorithm have been confirmed. In this regard, the results of the multi-modality detection of both approaches, that is, based upon an analysis of the multimedia data provided by the camera and based upon the probe data, may be considered to be the same in an instance in which both approaches fail to identify a multi-modality condition along the road segment. In addition, the results of the multi-modality detection of both approaches may be considered the same in an instance in which both approaches identify a multi-modality condition along the road segment and both approaches associate a higher speed with the same lane(s) of the road segment and a lower speed with the same lane(s) of the road segment.

In instances in which the apparatus 20, such as the processor 22, determines that the identification of a multi-modality condition along the road segment has produced different results in accordance with the analysis of the multimedia data of the camera and in accordance with the analysis of the probe data by the detection algorithm, the apparatus, such as the processor, is configured to modify one or more of the tuning parameters of the detection algorithm that is utilized to analyze the probe data in an effort to align the results of the multi-modality analysis performed by the detection algorithm of the probe data with the results of the multi-modality analysis of the multimedia data from the camera. See block 54. The results of the multi-modality analysis performed upon the multimedia data of the camera and upon the probe data may differ from one another in an instance in which one of the approaches detects a multi-modality condition and the other approach fails to detect a multi-modality condition. In addition, the results of the multi-modality analysis performed upon the multimedia data of the camera and upon the probe data may differ from one another in an instance in which both approaches detect a multi-modality condition, but the results of the two approaches associate the higher speed and the lower speed with different lanes of the road segment leading to the junction 10.

As noted above, the detection algorithm includes one or more tuning parameters that may be modified in order to correspondingly modify the results of the detection algorithm. The tuning parameters may vary depending upon the type of detection algorithm that is utilized. In an example embodiment, however, in which the apparatus 20, such as the processor 22, utilizes a bi-modality detection algorithm as set forth in pseudo code above, the bi-modality detection algorithm includes tuning parameters in the form of a minimum probe count, a bi-modality magnitude, congestion criteria and persistence duration. The minimum probe count defines the minimum number of probe points along the road segment approaching the junction that are required to accurately assess the multi-modality conditions along the road segment, such as represented by $b_1>3$ in the pseudo code for the bi-modality detection algorithm in which the minimum number of probe points is 3. The bi-modality magnitude defines a value determined in accordance with the bi-modality detection algorithm in order to detect a bi-modality condition with values less than the bi-modality magnitude not being indicative of a bi-modality condition and values equaling or exceeding the bi-modality magnitude being considered to be representative of a bi-modality condition. In the pseudo code for the bi-modality detection algorithm provided above, the bi-modality magnitude is defined as BiM and is represented by $BiM>0.4$. Although the congestion criteria may be defined in various manners, but in an example embodiment, is a ratio of the lowest speed to the highest speed from among the lanes of the road segment approaching the junction. The threshold for this ratio may be set to different values, but is 0.72 in an example embodiment with congestion being identified in instances in which the ratio is less than the threshold. The function of the congestion criteria is to insure that prior to publishing lane level traffic information indicative of a bi-modality condition the lowest speed is sufficiently distinct from the highest speed so as to be indicative of lane level congestion, thereby increasing the likelihood that the lane level traffic information is useful to the driver. Typically, the apparatus, such as the processor, evaluates the congestion criteria occurs after the detection of a multi-modality condition with the detection algorithm and prior to the publishing of the lane level traffic information. The persistence duration is the length of time for which a multi-modality condition that has already been published will continue to be re-published following its first occurrence. The apparatus, such as the processor, typically evaluates the persistence duration after the detection of a multi-modality condition with the detection algorithm The apparatus 20, such as the processor 22, may be configured to modify the one or more tuning parameters in various manners. For an example, different combinations of the tuning parameters may be modified or the tuning parameters may be modified in a sequential manner in an effort to align the two approaches for identifying a multi-modality condition. Additionally, the manner in which the respective tuning parameters are modified, such as the magnitude of the modification and the direction of the modification, may be varied. In an example embodiment, however, the apparatus, such as the processor, is configured to modify one or more of the tuning parameters in a predefined manner and to then reevaluate the probe data from the same time epoch that was previously evaluated utilizing both the multimedia data and the probe data with the results in terms of the identification of the multi-modality condition being found to differ between the two approaches. In this regard, the apparatus, such as the processor, is configured to modify one or more of the tuning parameters in a predefined manner and to then reevaluate the probe data from the same time epoch along the road segment upstream of the junction in accordance with the detection algorithm as modified based upon the one or more tuning parameters to again determine whether a multi-modality condition exists along the road segment. The results of the application of the modified detection algorithm are again compared to the results of the analysis of the multimedia data from the camera for the same time epoch and a determination is made as to whether the results from the two approaches are the same or the results from the two approaches again differ as described above.

In an instance in which the results in terms of the identification of a multi-modality condition along the road segment upstream of the junction from the two approaches are the same (such as defined above), the apparatus 20, such as the processor 22, may cease further modification of the tuning parameters of the detection algorithm, at least for now, since the results of the determination as to whether a multi-modality condition exists with the modified detection algorithm have been brought into agreement with the analysis of the multimedia data from the camera. If, however, the results in terms of the identification of a multi-modality condition by the two different approaches still differ, the apparatus, such as the processor, is configured to again modify one or more of the tuning parameters of the detection algorithm in a different predefined manner and to then repeat the foregoing process in order to determine if the modified detection algorithm identifies a multi-modality condition in a more consistent manner with the analysis of the multimedia data representative of the traffic conditions on the road segment upstream of the junction during the same time epoch.

This process may be repeated until the results achieved in terms of the identification of a multi-modality condition by the modified detection algorithm is brought into alignment with the results of the analysis of the multimedia data in terms of the identification of a multi-modality condition, or until all potential modifications to the tuning parameters of the detection algorithm have been exhausted without bringing the results of the two approaches into alignment. In an instance in which the modifications to the detection algorithm bring the results in terms of the identification of a multi-modality condition into alignment with the results of the analysis of the multimedia data from the same time epoch, the modified tuning parameters are stored, such as modifying the memory 24 by replacing the prior tuning parameters stored in the memory with the modified tuning parameters, and the modified detection algorithm is thereafter utilized in conjunction with the analysis of probe data, at least of the road segment upstream of the respective junction during different, such as subsequent, time epochs. See block 56. Alternatively, in an instance in which all potential modifications of the tuning parameters have been exhausted without bringing the results in terms of the identification of a multi-modality condition into alignment between the two approaches, the disagreement between the two approaches may be flagged and may be provided to a system administrator or the like for further review.

By relying upon multimedia data from a camera in combination with the probe data analyzed in accordance with a detection algorithm, the detection algorithm may be tuned so as to produce improved or more consistent results. Thus, the detection algorithm may be adapted for different junctions supporting different traffic flow patterns as well as for different types of probe data, such as different quantities of probe data, probe data with different levels of precision relative to position, etc. Consequently, the lane level traffic information provided by the method, apparatus 20 and computer program product of an example embodiment may be improved as a result of the modification of the detection algorithm and, consequently, the reliability of the information provided by a navigation system, such as in terms of alerts or other messages provided to drivers based upon the lane level traffic information provided by the analysis performed by the modified detection algorithm, may be correspondingly enhanced. Further, the analysis of the multimedia data from a camera may also provide for additional alert messages to be provided to identify drivers or others of the multi-modality condition, such as by alerting drivers or others as to one or more lanes of the road segment upstream of the junction 10 that may experience slower speeds and should be avoided, if possible. Thus, the resulting driver experience may be enhanced.

FIG. 3 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the That which is claimed:

1. A navigation system comprising:
   a communication interface configured to receive multimedia data including one or more images from a camera representative of traffic conditions along a road segment upstream of a junction; and
   at least one processor configured to:
   identify a multi-modality condition along the road segment upstream of the junction based upon an analysis of the multimedia data including the one or more images;
   evaluate a plurality of probe points representative of travel along the road segment upstream of the junction in accordance with a detection algorithm to separately determine whether the multi-modality condition exists along the road segment upstream of the junction; and
   determine whether to modify one or more tuning parameters of the detection algorithm based upon the multi-modality condition identified based upon the analysis of the multimedia data including the one or more images,
   wherein the communication interface is also configured to cause an alert message to be provided based upon the multi-modality condition identified based upon the analysis of the multimedia data including the one or more images.

2. A navigations system according to claim 1 wherein the one or more tuning parameters comprise a minimum probe count, a bi-modality magnitude, a congestion criteria or a persistence duration.

3. A navigation system according to claim 1 wherein the at least one processor is further configured to subsequently evaluate the plurality of probe points representative of travel along the road segment upstream of the junction in accordance with the detection algorithm and utilize the one or more tuning parameters, as modified, to determine whether the multi-modality condition exists along the road segment upstream of the junction.

4. A method implemented by a computing device, the method comprising:
   receiving multimedia data including one or more images from a camera representative of traffic conditions along a road segment upstream of a junction;
   identifying a multi-modality condition along the road segment upstream of the junction based upon an analysis of the multimedia data including the one or more images;
   evaluating a plurality of probe points representative of travel along the road segment upstream of the junction in accordance with a detection algorithm to separately determine whether the multi-modality condition exists along the road segment upstream of the junction;
   determining whether to modify one or more tuning parameters of the detection algorithm based upon the multi-modality condition identified based upon the analysis of the multimedia data including the one or more images; and
   causing an alert message to be provided based upon the multi-modality condition identified based upon the analysis of the multimedia data including the one or more images.

5. A method according to claim 4 wherein the alert message comprises an image of the traffic conditions along the road segment upstream of the junction.

6. A method according to claim 4 wherein the one or more tuning parameters comprise a minimum probe count, a bi-modality magnitude, a congestion criteria or a persistence duration.

7. A method according to claim 4 wherein identifying the multi-modality condition based upon the analysis of the multimedia data comprises analyzing the one or more images to identify the multi-modality condition based upon an estimated volume of vehicles in each of a plurality of lanes of the road segment.

8. A method according to claim 7 wherein analyzing the one or more images to identify the multi-modality condition comprises identifying the multi-modality condition based upon a difference in the estimated volume of vehicles between two of the plurality of lanes of the road segment.

9. A method according to claim 4 further comprising subsequently evaluating the plurality of probe points representative of travel along the road segment upstream of the junction in accordance with the detection algorithm and utilizing the one or more tuning parameters, as modified, to determine whether the multi-modality condition exists along the road segment upstream of the junction.

10. A method according to claim 4 wherein the one or more tuning parameters of the detection algorithm comprise predefined conditions utilized by the detection algorithm.

11. An apparatus comprising at least one processor and at least one memory including computer program instructions, the at least one memory and the computer program instructions, with the at least one processor, causing the apparatus at least to:
    receive multimedia data including one or more images from a camera representative of traffic conditions along a road segment upstream of a junction;
    identify a multi-modality condition along the road segment upstream of the junction based upon an analysis of the multimedia data including the one or more images;
    evaluate a plurality of probe points representative of travel along the road segment upstream of the junction in accordance with a detection algorithm to separately determine whether the multi-modality condition exists along the road segment upstream of the junction;
    determine whether to modify one or more tuning parameters of the detection algorithm based upon the multi-modality condition identified based upon the analysis of the multimedia data including the one or more images; and
    cause an alert message to be provided based upon the multi-modality condition identified based upon the analysis of the multimedia data including the one or more images.

12. An apparatus according to claim 11 wherein the alert message comprises an image of the traffic conditions along the road segment upstream of the junction.

13. An apparatus according to claim 11 wherein the one or more tuning parameters comprise a minimum probe count, a bi-modality magnitude, a congestion criteria or a persistence duration.

14. An apparatus according to claim 11 wherein the at least one memory and the computer program instructions, with the at least one processor, cause the apparatus to identify the multi-modality condition based upon the analysis of the multimedia data by analyzing the one or more images to identify the multi-modality condition based upon an estimated volume of vehicles in each of a plurality of lanes of the road segment.

15. An apparatus according to claim 14 wherein the at least one memory and the computer program instructions, with the at least one processor, cause the apparatus to analyze the one or more images to identify the multi-modality condition by identifying the multi-modality condition based upon a difference in the estimated volume of vehicles between two of the plurality of lanes of the road segment.

16. An apparatus according to claim 11 wherein the at least one memory and the computer program instructions, with the at least one processor, further cause the apparatus to subsequently evaluate the plurality of probe points representative of travel along the road segment upstream of the junction in accordance with the detection algorithm and utilize the one or more tuning parameters, as modified, to determine whether the multi-modality condition exists along the road segment upstream of the junction.

17. An apparatus according to claim 11 wherein the one or more tuning parameters of the detection algorithm comprise predefined conditions utilized by the detection algorithm.

18. A computer program product comprising at least one non-transitory computer-readable storage medium bearing computer program instructions embodied therein for use with a computer, the computer program instructions comprising program instructions which, when executed, cause the computer at least to:
receive multimedia data including one or more images from a camera representative of traffic conditions along a road segment upstream of a junction;
identify a multi-modality condition along the road segment upstream of the junction based upon an analysis of the multimedia data including the one or more images;
evaluate a plurality of probe points representative of travel along the road segment upstream of the junction in accordance with a detection algorithm to separately determine whether the multi-modality condition exists along the road segment upstream of the junction;
determine whether to modify one or more tuning parameters of the detection algorithm based upon the multi-modality condition identified based upon the analysis of the multimedia data including the one or more images; and
cause an alert message to be provided based upon the multi-modality condition identified based upon the analysis of the multimedia data including the one or more images.

19. A computer program product according to claim 18 wherein the one or more tuning parameters comprise a minimum probe count, a bi-modality magnitude, a congestion criteria or a persistence duration.

20. A computer program product according to claim 18 wherein the program instructions configured to identify the multi-modality condition based upon the analysis of the multimedia data comprise program instructions configured to analyze the one or more images to identify the multi-modality condition based upon an estimated volume of vehicles in each of a plurality of lanes of the road segment.

21. A computer program product according to claim 20 wherein the program instructions configured to analyze the one or more images to identify the multi-modality condition comprise program instructions configured to identify the multi-modality condition based upon a difference in the estimated volume of vehicles between two of the plurality of lanes of the road segment.

22. A computer program product according to claim 18 wherein the computer program instructions further comprise program instructions configured to subsequently evaluate the plurality of probe points representative of travel along the road segment upstream of the junction in accordance with the detection algorithm and to utilize the one or more tuning parameters, as modified, to determine whether the multi-modality condition exists along the road segment upstream of the junction.

23. A computer program product according to claim 18 wherein the one or more tuning parameters of the detection algorithm comprise predefined conditions utilized by the detection algorithm.

* * * * *